UNITED STATES PATENT OFFICE.

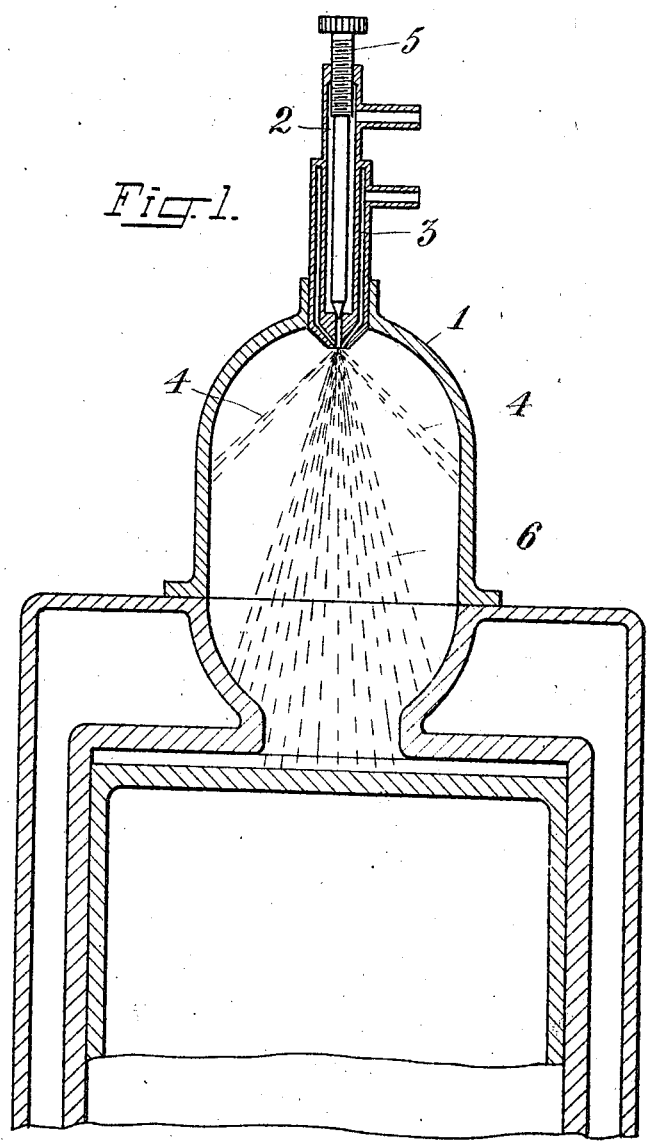

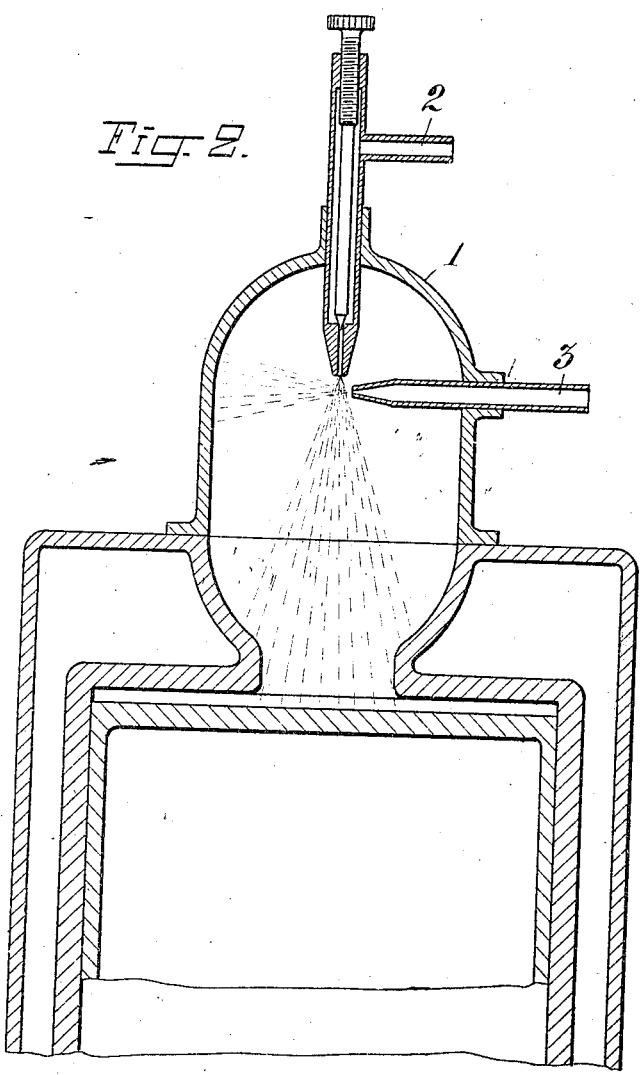

ERIK ANTON RUNDLÖF, OF STOCKSUND, SWEDEN.

INTERNAL-COMBUSTION ENGINE AND THE LIKE.

1,173,745.

Specification of Letters Patent.

Patented Feb. 29, 1916.

Application filed September 11, 1914. Serial No. 861,189.

*To all whom it may concern:*

Be it known that I, ERIK ANTON RUNDLÖF, a subject of the King of Sweden, residing at Stocksund, in the Kingdom of Sweden, have invented new and useful Improvements in Internal-Combustion Engines and the like, of which the following is a specification, reference being had to the drawing accompanying and forming part hereof.

When injecting fuel into internal-combustion engines especially into engines with comparatively low compression it is of importance to so regulate the injection that the fuel hits a more or less heated part of the combustion chamber or working chamber, according to the variation of the load. When starting and also when working at no load or at a small load the fuel should hit a part heated as strongly as possible in order that the gasification and ignition should take place sufficiently quick but when increasing the load of the motor the fuel should hit a part less heated according to the load in order to prevent pre-ignition. It has, therefore, been necessary to control the injection of fuel in said manner and the nozzel for injection of fuel has, therefore, been made movable, for instance by swinging, so that the jet of fuel by directing the nozzle could be directed onto a certain spot. In the practice, however, such an arrangement is not practical for many reasons, particularly in that it is hardly possible to make a perfect packing between the movable nozzle and the wall of the combustion chamber. If a controlling device for said purpose is to be practical the inlet of fuel must remain fixed as compared with the wall of the combustion chamber.

Such an arrangement is the object of the present invention, which is broadly characterized by this that one or more inlets for fuel on the motor are so situated or constructed as compared with the inlet or inlets of air, gas or steam, or vice versa, that the fuel when injected alone, that is to say when not meeting with air, gas or steam, enters a certain zone of the combustion chamber or working chamber, for instance a strongly heated zone, but when the injection is accompanied by the simultaneous injection of air, gas or steam, the jet or jets of fuel will strike another, differently heated part of the combustion chamber or working chamber according to the load on the motor.

Two constructional forms are shown in the drawing in which—

1 is the combustion chamber of the motor or the ignition chamber provided with inlet 2 for air, gas or steam and inlet 3 for fuel. The first mentioned is preferably arranged concentric with the latter, Figure 1, which is of such a shape or so arranged that if the fuel is ejected alone, that is to say if the inlet 2 for air is shut off, the fuel is ejected to the sides as shown in the drawing indicated by 4, and the jet of fuel will then strike the upper or more heated part of the ignition chamber which if necessary is heated by a lamp when starting. The device is operated in this way when starting and also when not loaded or at a small load on the motor. At increased loads, however, the air, gas or steam is turned on through the inlet 2 by opening the valve 5. The air, etc., carries with it the fuel so that the air and fuel are projected against the lower inside of the ignition chamber or working chamber or against the piston or against both of them as shown by 6 in Fig. 1, these parts being less heated or if necessary cooled in any suitable manner.

The arrangement can also be made as indicated by Fig. 2 showing the inlets for air and fuel arranged at angles with one another in such a manner that, if the fuel only is injected, it will strike the upper or the outer strongly heated part of the chamber but if both air and fuel are injected the air deflects the fuel to the lower or inner less heated part of the chamber. The efficiency of the air for carrying with it the fuel in said manner is not only dependent on the reciprocal location of the inlets for air and fuel but also on the condition of the inlets. The inlets for air and fuel can also be so arranged that the air injects the fuel and, if necessary, there may be arranged several inlets of air so located that they when used in turn carry the fuel to certain parts of the ignition chamber.

I do not wish to be understood as limiting myself strictly to the precise details of construction hereinbefore described and shown in the accompanying drawing, as it is obvious that these details may be varied without departing from the principle of my invention.

Having now described my invention and how it may be carried out, what I claim and desire to secure by Letters Patent, is:

In an internal combustion engine, the combination with a combustion chamber having differently heated zones, of an inlet for fuel, and an inlet for air, gas or steam, said inlets being arranged and located in the combustion chamber in such relation to each other, that when fuel alone is injected into the engine it strikes one zone of the combustion chamber, but when fuel and air, gas or steam are injected simultaneously the fuel will strike another differently heated zone of the combustion chamber, substantially as and for the purpose set forth.

ERIK ANTON RUNDLÖF.

Witnesses:
 FREDR. NORDSJD,
 NIORD GUSTAFSON.